(12) United States Patent
Ueno

(10) Patent No.: US 7,564,599 B2
(45) Date of Patent: Jul. 21, 2009

(54) IMAGE SCANNING APPARATUS, IMAGE FORMING APPARATUS AND IMAGE SCANNING METHOD

(75) Inventor: Sueo Ueno, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 381 days.

(21) Appl. No.: 11/458,371

(22) Filed: Jul. 18, 2006

(65) Prior Publication Data

US 2008/0018954 A1    Jan. 24, 2008

(51) Int. Cl.
*H04N 1/04* (2006.01)

(52) U.S. Cl. .................. 358/475; 358/496; 358/497; 358/474

(58) Field of Classification Search ........... 358/475, 358/509, 497, 494, 474, 505, 463, 464, 465, 358/496; 250/234–236, 559.36, 559.12; 382/318, 319, 273, 274, 275
See application file for complete search history.

(56) References Cited

U.S. PATENT DOCUMENTS

| | | | | |
|---|---|---|---|---|
| 4,930,008 A | * | 5/1990 | Suzuki et al. ............... | 358/500 |
| 5,608,547 A | * | 3/1997 | Nakatani et al. ............ | 358/505 |
| 5,969,371 A | * | 10/1999 | Andersen et al. ........ | 250/559.15 |
| 6,744,540 B1 | * | 6/2004 | Masuda et al. .............. | 358/488 |
| 2001/0035986 A1 | * | 11/2001 | Ikeda ......................... | 358/475 |

FOREIGN PATENT DOCUMENTS

| | | |
|---|---|---|
| JP | 8-171148 | 7/1996 |
| JP | 2000-184136 | 6/2000 |

* cited by examiner

*Primary Examiner*—Cheukfan Lee
(74) *Attorney, Agent, or Firm*—SoCal IP Law Group LLP; Steven C. Sereboff; John E. Gunther

(57) ABSTRACT

An image forming apparatus according to the invention includes: a sensor disposed under an original stand, on which an original is placed, to be in close contact with the original stand; a first light source that irradiates light on a scanning area of the original from a direction obliquely below the original; and a second light source that is disposed in a position opposite to the first light source across the sensor and irradiates light from a direction obliquely below the original opposite to a direction of the light irradiated from the first light source. When the original is not a stuck original, the first light is turned on and, when the original is a stuck original, the first light source and the second light source are turned on. According to the image forming apparatus according to the invention, it is possible to reduce power consumption while preventing occurrence of an original shade of a stuck original in a contact-type optical system.

20 Claims, 5 Drawing Sheets

IMAGE SCANNING APPARATUS, IMAGE FORMING APPARATUS AND IMAGE SCANNING METHOD

BACKGROUND OF THE INVENTION

1. Field of the Invention

The present invention relates to an image scanning apparatus, an image forming apparatus, and an image scanning method, and, more particularly to an image scanning apparatus, an image forming apparatus, and an image scanning method that use a contact-type sensor.

2. Description of the Related Art

An image scanning apparatus such as a scanner and an image forming apparatus such as a copying machine include optical systems for scanning an original. The optical systems can be classified into a "reduction optical system" and a "contact optical system" (a CIS system: Contact Image Sensor).

The "reduction optical system" is a system for, while returning reflected light from an original many times with a mirror, leading the reflected light to a condenser lens and reading a reflection signal from the original with a sensor provided in a position apart from the original. Compared with the "contact optical system", the "reduction optical system" has an advantage that a large depth of field can be secured. However, since an optical path length from the original to the sensor is large, in general, a physical length of the "reduction optical system" is large.

On the other hand, the "contact optical system" is a system for arranging a sensor under an original to be in contact with the original. The "contact optical system" has a disadvantage that a depth of field is small but has an advantage that a physical size thereof is small.

An original obtained by partially sticking two or more originals together (hereinafter referred to as stuck original) is included in originals to be scanned by the scanner or the copying machine. Since such a stuck original has a step in a stuck portion, the portion of the step may form a shade (hereinafter referred to as original shade) and appear as a black line in image data scanned.

In the case of the "reduction optical system", since it is possible to irradiate direct light from a light source and reflected light from a mirror on the step of the stuck portion from different directions, an influence of the original shade is relatively small.

On the other hand, since the "contact system optical system" is a form in which a mirror is not provided, there is a problem in that, when an original is irradiated by one light source from a direction obliquely below the original, an influence of the original shade of the stuck portion is large.

In order to solve this problem, in the "contact system optical system", a method of providing two light sources on the left and the right across a contact-type sensor and irradiating a step portion of an original from left and right two directions obliquely below the original to prevent occurrence of an original shade is considered.

However, since this method is a form in which two light sources are used, there is a problem in that power consumption increases.

SUMMARY OF THE INVENTION

The invention has been devised in view of the circumstances and it is an object of the invention to provide an image scanning apparatus and an image forming apparatus, which include contact optical systems, and an image scanning method that can reduce power consumption while preventing occurrence of an original shade of a stuck original.

In order to attain the object, an image scanning apparatus according to an aspect of the invention includes: a sensor disposed under an original stand, on which an original is placed, to be in close contact with the original stand; a first light source that irradiates light on a scanning area of the original from a direction obliquely below the original; and a second light source that is disposed in a position opposite to the first light source across the sensor and irradiates light on the scanning area of the original from a direction obliquely below the original opposite to a direction of the light irradiated from the first light source. When the original is not a stuck original, the first light source is turned on and, when the original is a stuck original, the first light source and the second light source are turned on.

In order to attain the object, an image forming apparatus according to another aspect of the invention includes: a scanner unit; an image processing unit that applies various kinds of image processing to image data generated by the scanner unit; and an image forming unit that prints the image data subjected to the image processing on recording paper. The scanner unit includes: a sensor disposed under an original stand, on which an original is placed, to be in close contact with the original stand; a first light source that irradiates light on a scanning area of the original from a direction obliquely below the original; and a second light source that is disposed in a position opposite to the first light source across the sensor and irradiates light on the scanning area of the original from a direction obliquely below the original opposite to a direction of the light irradiated from the first light source. When the original is not a stuck original, the first light source is turned on and, when the original is a stuck original, the first light source and the second light source are turned on.

In order to attain the object, an image scanning method according to still another aspect of the invention includes the steps of: scanning an original using a sensor disposed under an original stand, on which the original is placed, to be in close contact with the original stand; irradiating light on a scanning area of the original from a direction obliquely below the original using a first light source; and irradiating light on the scanning area of the original from a direction obliquely below the original opposite to a direction of the light irradiated from the first light source using a second light source that is disposed in a position opposite to the first light source across the sensor. When the original is not a stuck original, the first light source is turned on and, when the original is a stuck original, the first light source and the second light source are turned on.

DETAILED DESCRIPTION OF THE PREFERRED EMBODIMENTS

Embodiments of an image scanning apparatus, an image forming apparatus, and an image scanning method according to the invention will be hereinafter explained with reference to the drawings.

(1) Structure of the Image Forming Apparatus

Figure 1:
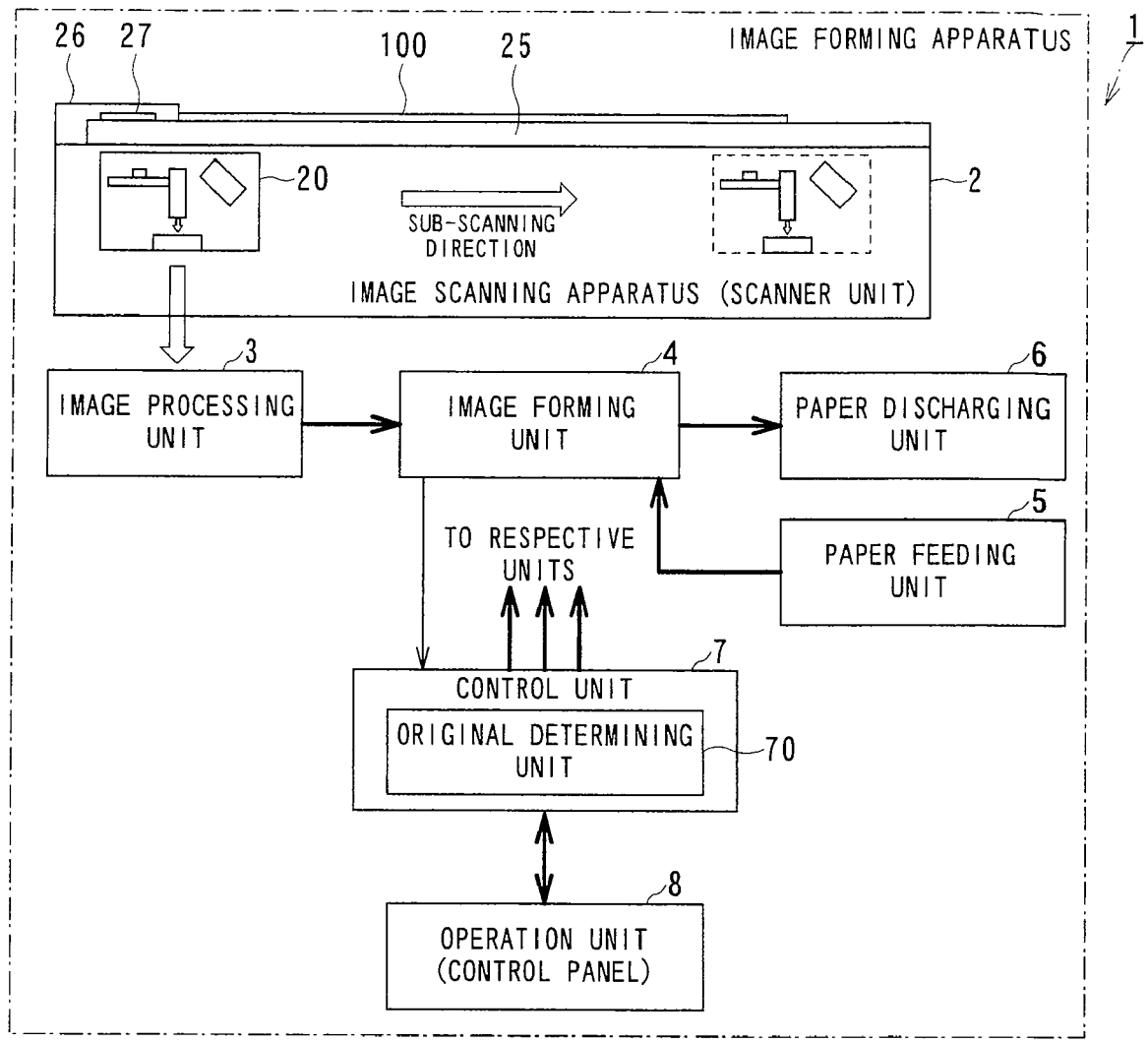
FIG. 1 is a diagram showing an example of structures of an image scanning apparatus and an image forming apparatus according to an embodiment of the invention.

FIG. 1 is a diagram showing an example of a structure of an image forming apparatus 1 according to an embodiment of the invention.

The image forming apparatus 1 includes an image scanning apparatus 2 (a scanner unit 2), an image processing unit 3, an image forming unit 4, a paper feeding unit 5, a paper discharging unit 6, a control unit 7, and an operation unit 8.

The image scanning apparatus 2 has an original glass stand 25 on which an original 100 is placed. A contact-type sensor (CIS) unit 20 is provided under the original glass stand 25 to be in close contact with the original glass stand 25.

As indicated by an arrow in the figure, the CIS unit 20 scans the original 100 while moving in a sub-scanning direction from a leading end to a trailing end of the original 100 placed on the original glass stand 25 and outputs image data scanned to the image processing unit 3.

An original bumping plate 26 is provided for positioning of the original 100 at a front end of the original glass stand 25. A white reference plate 27 is provided below the original bumping plate 26. The white reference plate 27 is used as a reference reflection plate in correcting non-uniformity and the like of an amount of light of a light source and sensitivity of a sensor (shading correction) with respect to a main scanning direction (a depth direction perpendicular to the sub-scanning direction).

The image data outputted from the CIS unit 20 is subjected to various kinds of image processing such as shading correction, color conversion processing, space filtering processing, and tone correction processing in the image processing unit 3.

The image data subjected to the image processing is inputted to the image forming unit 4. The image forming unit 4 exposes and develops the image data to form a toner image, for example, on a photosensitive drum (not shown) according to an electrophotographic process or the like.

On the other hand, recording paper supplied from the paper feeding unit 5 is conveyed to the image forming unit 4. In the image forming unit 4, the toner image is transferred onto the recording paper from the photosensitive drum and fixed on the recording paper. An image is printed on the recording paper. The recording paper having the image printed thereon is discharged to the outside from the paper discharging unit 6.

The control unit 7 includes a CPU and the like and performs control for the entire image forming apparatus 1. The operation unit 8 is connected to the control unit 7. The operation unit 8 is also called a control panel and includes a liquid crystal display and a touch panel or various switches.

(2) Structure of the CIS Unit

Figure 2:
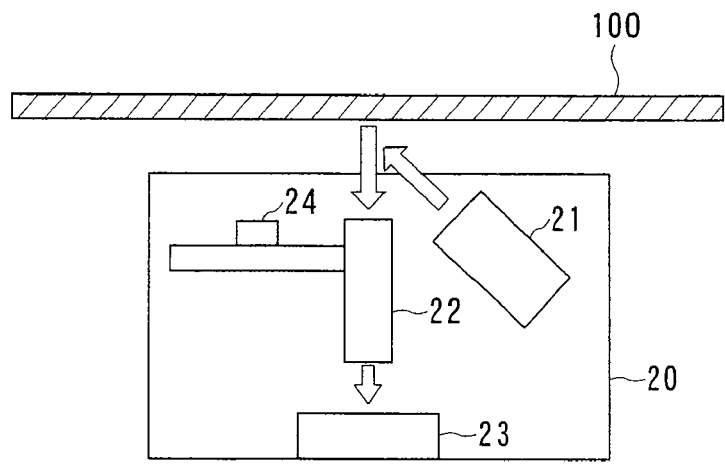
FIG. 2 is a diagram showing an example of a structure of a CIS unit according to the embodiment.

FIG. 2 is a diagram showing an example of a structure of the CIS unit 20. The CIS unit 20 includes two exposure lamps, namely, a main lamp (a first light source) 21 and an auxiliary lamp (a second light source) 24.

The main lamp 21 includes, for example, a light guide tube extending in the main scanning direction and three LEDs of red, green, and blue provided at one end of the light guide tube. Light radiated from the LEDs is deflected while propagating through the light guide tube and uniformly irradiates the original in the main scanning direction.

It is possible to output image data of R, G, and B with respect to a color original by moving the CIS unit 20 in the sub-scanning direction while sequentially switching the three LEDs of red, green, and blue.

On the other hand, the auxiliary lamp 24 is, for example, a light source constituted by an LED linear array of YG (Yellow-Green). As described later, in scanning a stuck original, occurrence of an original shade of the stuck original is prevented by irradiating the original from a direction different from a direction of the main lamp 21.

The CIS unit 20 further includes a self-focusing lens 22 and a CCD sensor (a sensor) 23.

The self-focusing lens is a lens also called a selfocs lens. The self-focusing lens 22 is constituted by arranging cylindrical lens units in an array shape in the main scanning direction.

The main lamp 21 and the auxiliary lamp 24 are arranged below the original glass stand (an original stand) 25 across this self-focusing lens 22.

Reflected light from an original placed on the original glass stand 25 is made incident on the self-focusing lens 22 via a glass of the original glass stand 25, condensed on the self-focusing lens 22, and focused on the CCD sensor 23.

FIG. 2 shows a state in which the usual original 100 (an original that is not a stuck original) is scanned. In this case, light is radiated only from the main lamp 21.

Figure 3A:
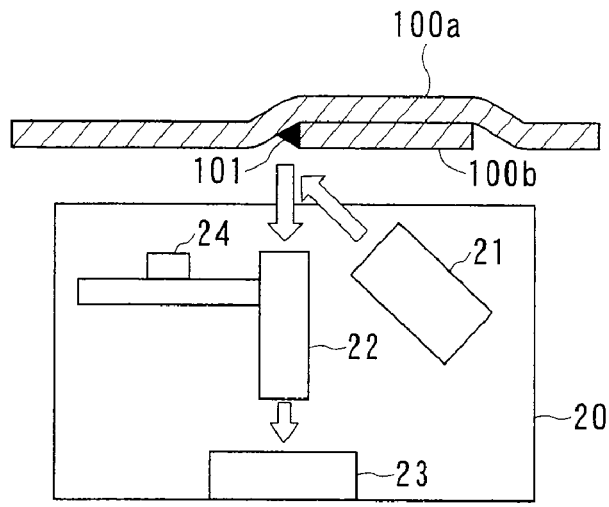
FIGS. 3A and 3B are diagrams schematically showing a state of an original shade that occurs when a stuck original is scanned only by a main lamp.
Figure 3B:
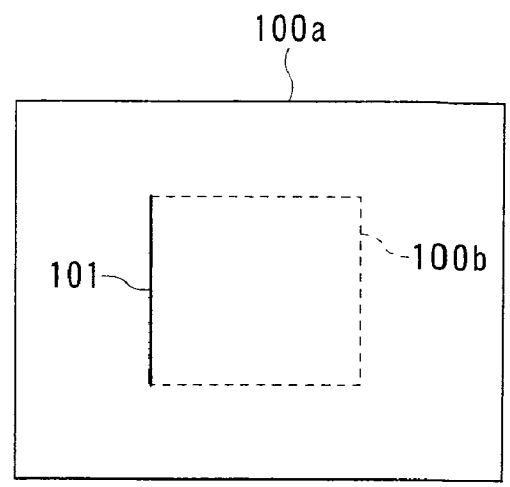

On the other hand, FIGS. 3A and 3B are diagrams schematically showing a state of an original shade 101 that occurs when a stuck original 100a is scanned.

The stuck original 100a is, as shown in FIG. 3A, obtained by sticking a partial original 100b on recording paper. This is a form frequently used, for example, when one original is created by cutting and sticking plural originals and when an original is corrected.

In the stuck original 100a, a step is formed in a portion at an edge of the partial original 100b. Therefore, when the original is scanned only by the main lamp 21, the step portion forms a shade to cause the original shade 101.

FIG. 3B is a diagram schematically showing a state in which the original shade 101 occurs in a formed image as a black line on a line.

Figure 4A:
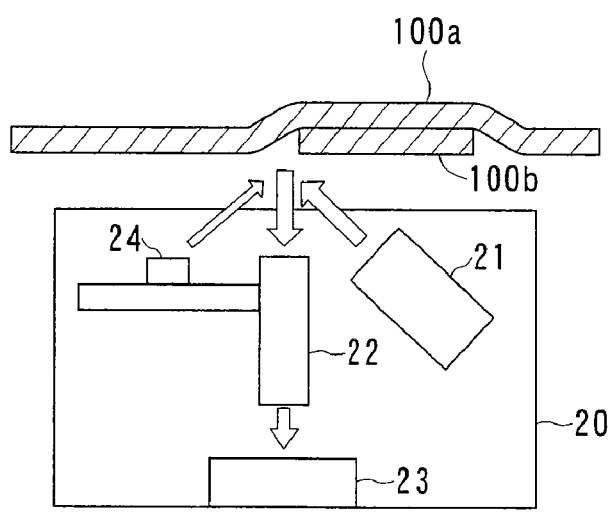
FIGS. 4A and 4B are diagrams schematically showing a state in which occurrence of an original shade can be reduced when a stuck original is scanned by both a main lamp and an auxiliary lamp.
Figure 4B:
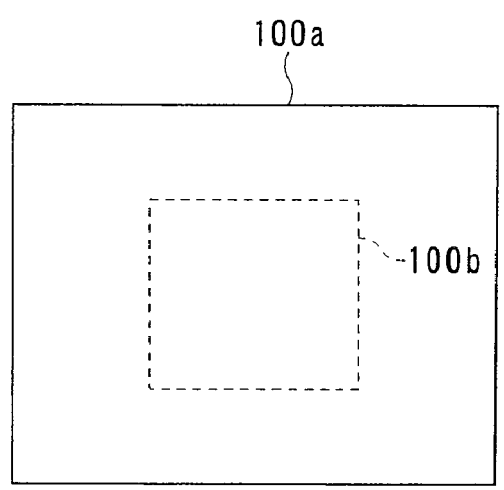

FIGS. 4A and 4B are diagrams showing a state in which the auxiliary lamp 24 is turned on in addition to the main lamp 21 in order to prevent the occurrence of such an original shade 101.

Irradiated light from the auxiliary lamp 24 is irradiated on the stuck original 100a from a direction obliquely below the stuck original 100a different from a direction of the main lamp 21 to prevent a shade from being caused by the step in the edge portion of the partial original 100b. As a result, as shown in FIG. 4B, it is possible to form a clear image without the original shade 101 even in the edge portion of the partial original 100b.

(3) Operations (First Embodiment)

Figure 5:
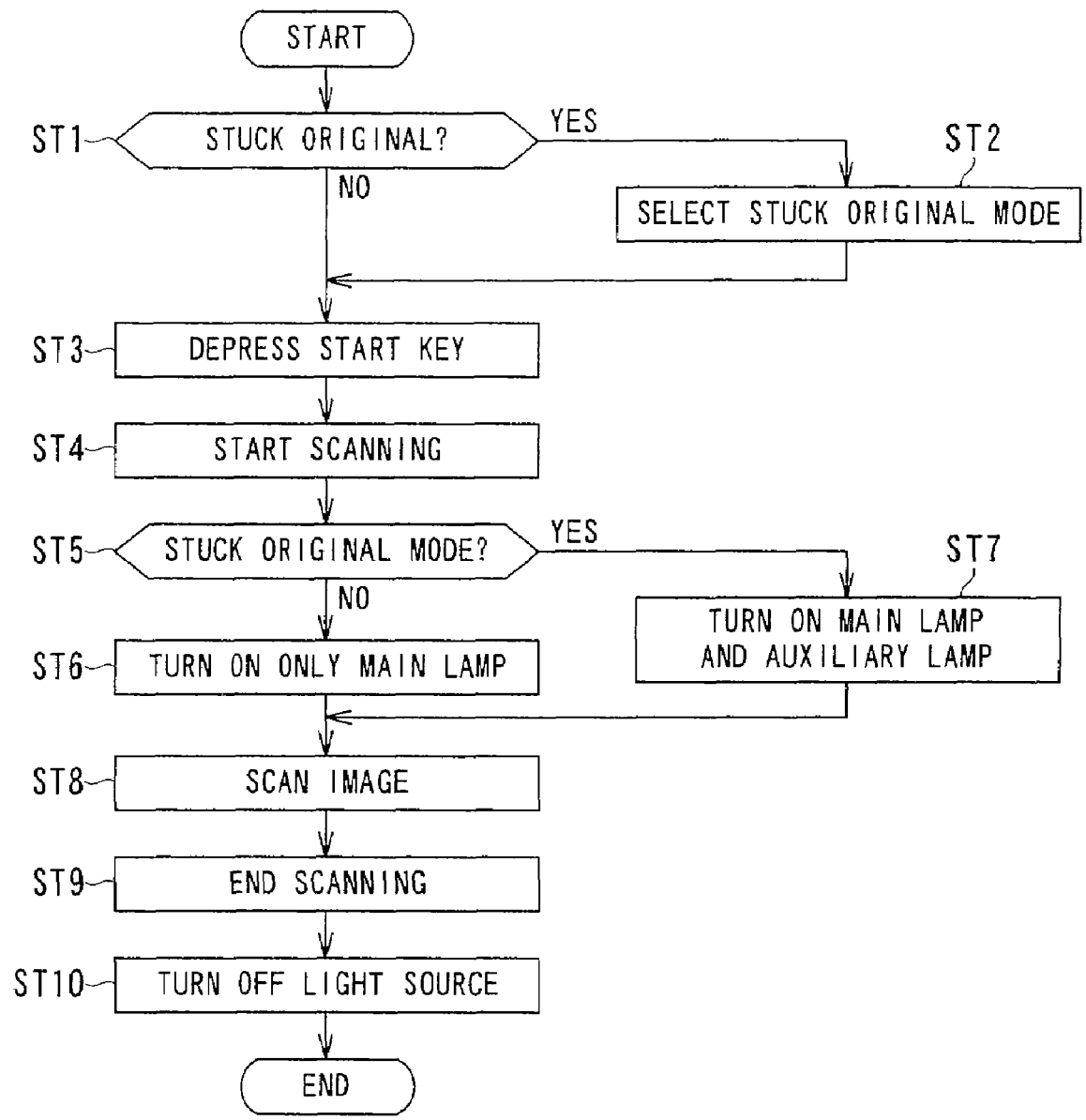
FIG. 5 is a flowchart showing an example of an operation, in particular, a lighting control method for a main lamp and an auxiliary lamp according to a first embodiment.

FIG. 5 is a flowchart for explaining an example of operations of the image forming apparatus 1 according to this embodiment (including operations of the image scanning apparatus 2), in particular, operations according to lighting control for the main lamp 21 and the auxiliary lamp 24.

First, a user determines, for example, visually whether an original to be scanned by the image forming apparatus 1 is the stuck original 100a (step ST1).

When the original is the stuck original 100a, the user operates the operation unit 8 and sets the image forming apparatus 1 in a "stuck original mode" (step ST2). The "stuck original mode" set is stored in, for example, an original determining unit 70 of the control unit 7.

The user depresses a start key provided in the operation unit 8 (step ST3). Scanning of the original is started under the control by the control unit 7 (step ST4).

The original determining unit 70 of the control unit 7 determines whether a set mode is the "stuck original mode" (step ST5). When the set mode is the "stuck original mode", the original determining unit 70 simultaneously turns on the two exposure lamps, the main lamp 21 and the auxiliary lamp 24 (step ST7) and performs scanning of the original (step ST8).

As a result, as shown in FIGS. 4A and 4B, it is possible to form a clear image that does not cause the original shade 101 in the stuck portion even in the stuck original 100a.

On the other hand, when the set mode is not the "stuck original mode", the original determining unit 70 turns on only the main lamp 21 (step ST6) and performs scanning of the original (step ST8).

When the original is not the stuck original 100a, it is unlikely that the original shade 101 occurs. It is possible to form a clear image by turning on only the main lamp 21. It is possible to save wasteful power consumption by turning off the auxiliary lamp 24.

When the scanning of the original ends (step ST9), in the case of the "stuck original mode", the original determining unit 70 turns off both the main lamp 21 and the auxiliary lamp 24. When the set mode is not the "stuck original mode", the original determining unit 70 turns off only the main lamp 21 (step ST10).

(4) Operations (Second Embodiment)

The form shown in FIG. 5 is a form in which the user determines whether an original to be scanned is the stuck original 100a and operates the operation unit 8 on the basis of the determination to set a mode to the "stuck original mode".

On the other hand, a second embodiment is a form in which the image forming apparatus 1 (or the image scanning apparatus 2) determines whether an original to be scanned is the stuck original 100a and automatically sets a mode to the "stuck original mode".

Figure 6:
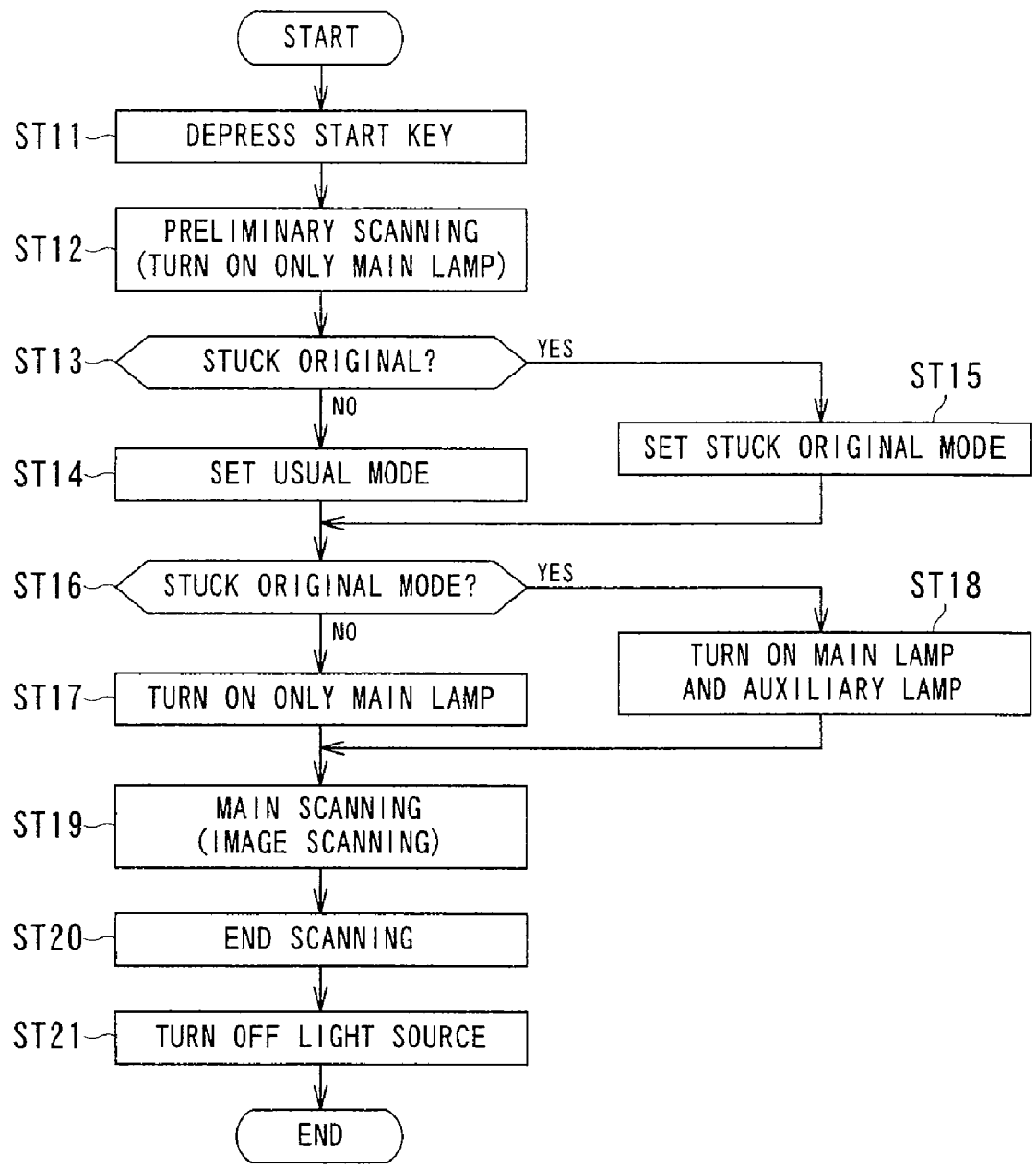
FIG. 6 is a flowchart showing an example of an operation, in particular, a lighting control method for a main lamp and an auxiliary lamp according to a second embodiment.

FIG. 6 is a flowchart showing an example of operations of the image forming apparatus 1 (or the image scanning apparatus 2) according to the second embodiment.

A user depresses a start key in order to start scanning of an original (step ST11).

In the second embodiment, first, preliminary scanning is performed according to the depression of the start key (step ST12). Since the scanning is performed by turning on only the main lamp 21, power consumption is relatively small.

For example, the original determining unit 70 provided in the control unit 7 determines whether an original scanned is the stuck original 100a on the basis of image data obtained by the preliminary scanning (step ST13).

Figure 7A:
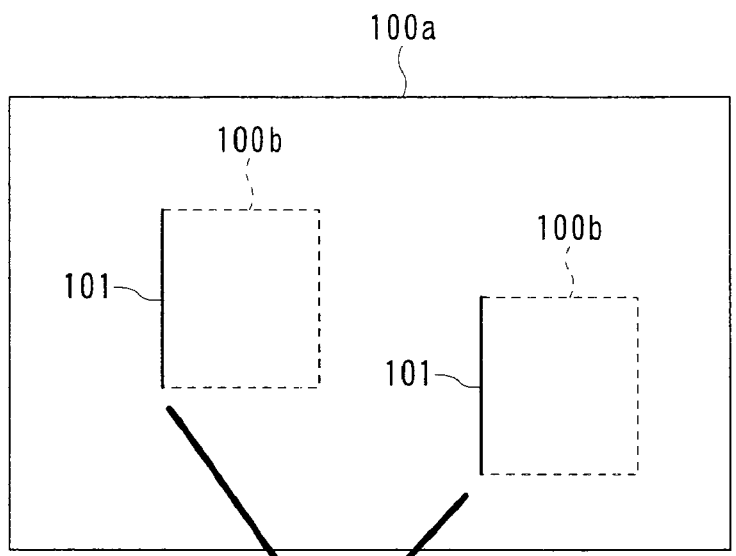
FIGS. 7A and 7B are diagrams for explaining characteristics of a stuck original used to automatically determine whether an original is a stuck original.
Figure 7B:
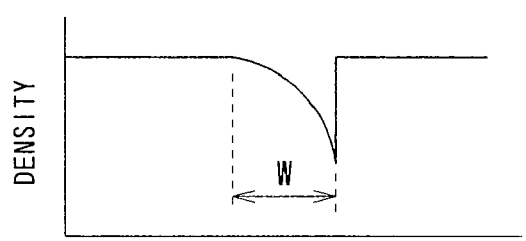

FIGS. 7A and 7B are diagrams schematically showing characteristics of the original shade 101 that occurs when an original is the stuck original 100a. Thickness of the partial original 100b stuck is usually limited to a certain range. Therefore, width W of the original shade 101 appearing in image data is usually limited to a certain range as well.

In addition, it is less likely that density of the original shade 101 changes at random within the width W of the original shade. The original shade 101 has a characteristic that the density usually changes monotonously. By adopting these characteristics found in the original shape in the stuck portion as determination criteria, it is possible to determine whether the original scanned by the preliminary scanning is the stuck original 100a.

The original determining unit 70 of the control unit 7 sets the "usual mode" or the "stuck original mode" on the basis of a result of the determination (steps ST14 and ST15).

In the case of the "stuck original mode" (Yes in step ST16), the original determining unit 70 turns on both the main lamp 21 and the auxiliary lamp 24 (step ST18). In the case of the "usual mode" (No in step ST16), the original determining unit 70 turns on only the main lamp 21 (step ST17).

In this lighting state, the original determining unit 70 performs main scanning (step ST19). When the scanning of the original ends (step ST20), in the case of the "stuck original mode", the original determining unit 70 turns off both the main lamp 21 and the auxiliary lamp 24. When a mode is not the "stuck original mode", the original determining unit 70 turns off only the main lamp 21 (step ST21).

In the second embodiment, since the preliminary scanning is required, longer time is taken for scanning. However, time and labor for visual determination of a state of an original by the user and time and labor for manual setting of the "stuck original mode" are saved.

As scanning of an original, there is a form of scanning by an automatic document feeder (ADF) other than the form of placing an original on an original stand and scanning the original.

Figure 8:
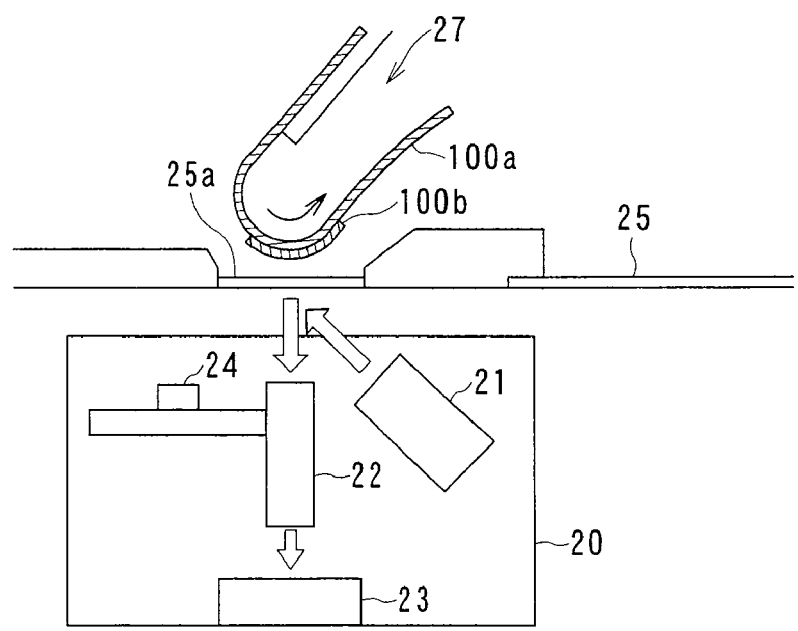
FIG. 8 is a diagram for explaining a lighting control method for a main lamp and an auxiliary lamp in the case in which an ADF is used.

FIG. 8 is a diagram schematically showing an example of an original scanning method using the ADF. Usually, a frequency of scanning the stuck original 100a using the ADF is not so high.

However, even if a user scans the stuck original 100a using the ADF, as shown in FIG. 8, when the stuck original 100a is scanned by the CIS unit 20, the stuck original 100a is scanned in a slightly curved state. Therefore, occurrence of the original shade 101 due to the step of the stuck portion is reduced compared with the case in which the stuck original 100a is placed flat on the original glass stand 25.

Thus, in this embodiment, in scanning an original using the ADF, the form of turning on only the main lamp 21 is adopted with priority given to a reduction in power consumption. Then, if the original shade 101 is conspicuous in an image formed, the form may be changed to the form of turning on both the main lamp 21 and the auxiliary lamp 24 according to operation of the operation unit 8.

The invention is not limited to the embodiments themselves. At a stage of carrying out the invention, it is possible to embody the invention by modifying the components without departing from the spirit of the invention. It is possible to form various inventions according to appropriate combinations of the plural components disclosed in the embodiments.

For example, several components may be deleted from all the components disclosed in the embodiments. Moreover, the components in the different embodiments may be appropriately combined.

What is claimed is:

1. An image scanning apparatus comprising:
a sensor disposed under an original stand, on which an original is placed, to be in close contact with the original stand;
a first light source that irradiates light on a scanning area of the original from a direction obliquely below the original; and
a second light source that is disposed in a position opposite to the first light source across the sensor and irradiates light on the scanning area of the original from a direction obliquely below the original opposite to a direction of the light irradiated from the first light source, wherein
when the original is not a stuck original, only the first light source is turned on,
when the original is a stuck original, the first light source and the second light source are turned on, and
wherein a light wavelength of the first light source differs from a light wavelength of the second light source.

2. An image scanning apparatus according to claim 1, further comprising an operation unit with which it is possible to set whether the original is a stuck original.

3. An image scanning apparatus according to claim 1, further comprising an original determining unit that determines whether the original is a stuck original.

4. An image scanning apparatus according to claim 3, wherein the original determining unit turns on the first light source to perform preliminary scanning and determines whether the original is a stuck original on the basis of presence or absence of a shade in a stuck boundary that occurs when the original is a stuck original.

5. An image scanning apparatus according to claim 1, wherein the sensor is a CCD line sensor, and a self-focusing lens is provided between the sensor and a lower surface of the original stand.

6. An image scanning apparatus according to claim 1, wherein the first light source is a light source including three LEDs of red, green, and blue and a linear light guide tube, and the second light source is a light source constituted by an LED linear array of yellow-green.

7. An image scanning apparatus according to claim 1, further comprising an ADF (Auto Document Feeder), wherein
when the image scanning apparatus scans an original with the sensor using the ADF, the image scanning apparatus turns on only the first light source to scan the original.

8. An image forming apparatus comprising:
a scanner unit;
an image processing unit that applies various kinds of image processing to image data generated by the scanner unit; and
an image forming unit that prints the image data subjected to the image processing on recording paper, wherein the scanner unit includes:
a sensor disposed under an original stand, on which an original is placed, to be in close contact with the original stand;
a first light source that irradiates light on a scanning area of the original from a direction obliquely below the original; and
a second light source that is disposed in a position opposite to the first light source across the sensor and irradiates light on the scanning area of the original from a direction obliquely below the original opposite to a direction of the light irradiated from the first light source, and wherein
when the original is not a stuck original, only the first light source is turned on,
when the original is a stuck original, the first light source and the second light source are turned on, and
wherein a light wavelength of the first light source differs from a light wavelength of the second light source.

9. An image forming apparatus according to claim 8, further comprising an operation unit with which it is possible to set whether the original is a stuck original.

10. An image forming apparatus according to claim 8, further comprising an original determining unit that determines whether the original is a stuck original.

11. An image forming apparatus according to claim 10, wherein the original determining unit turns on the first light source to perform preliminary scanning and determines whether the original is a stuck original on the basis of presence or absence of a shade in a stuck boundary that occurs when the original is a stuck original.

12. An image forming apparatus according to claim 8, wherein sensor is a CCD line sensor, and a self-focusing lens is provided between the sensor and a lower surface of the original stand.

13. An image forming apparatus according to claim 8, wherein the first light source is a light source including three LEDs of red, green, and blue and a linear light guide tube, and the second light source is a light source constituted by an LED linear array of yellow-green.

14. An image scanning method comprising the steps of:
scanning an original using a sensor disposed under an original stand, on which the original is placed, to be in close contact with the original stand;
irradiating light on a scanning area of the original from a direction obliquely below the original using a first light source; and
irradiating light on the scanning area of the original from a direction obliquely below the original opposite to a direction of the light irradiated from the first light source using a second light source that is disposed in a position opposite to the first light source across the sensor, wherein
when the original is not a stuck original, only the first light source is turned on,
when the original is a stuck original, the first light source and the second light source are turned on, and
wherein a light wavelength of the first light source differs from a light wavelength of a second light source.

15. An image scanning method according to claim 14, wherein it is determined on the basis of information inputted from an operation unit whether the original is a stuck original.

16. An image scanning method according to claim 14, further comprising a step of determining whether the original is a stuck original.

17. An image scanning method according to claim 16, wherein, in the determining step, the first light source is turned on to perform preliminary scanning and it is determined whether the original is a stuck original on the basis of presence or absence of a shade in a stuck boundary that occurs when the original is a stuck original.

18. An image scanning method according to claim 14, wherein the sensor is a CCD line sensor, and a self-focusing lens is provided between the sensor and a lower surface of the original stand.

19. An image scanning method according to claim 14, wherein first light source is a light source including three LEDs of red, green, and blue and a linear light guide tube, and the second light source is a light source constituted by an LED linear array of yellow-green.

20. An image scanning method according to claim 14, wherein, when an original is scanned by the sensor using an ADF, only the first light source is turned on to scan the original.

* * * * *

UNITED STATES PATENT AND TRADEMARK OFFICE
CERTIFICATE OF CORRECTION

PATENT NO. : 7,564,599 B2
APPLICATION NO. : 11/458371
DATED : July 21, 2009
INVENTOR(S) : Sueo Ueno Page 1 of 1

It is certified that error appears in the above-identified patent and that said Letters Patent is hereby corrected as shown below:

Column 8, line 24: Add "the" after --wherein--

Column 9, line 6: Add "the" after --wherein--

Signed and Sealed this

Eighth Day of September, 2009

David J. Kappos
*Director of the United States Patent and Trademark Office*